(12) United States Patent
Moreno et al.

(10) Patent No.: US 11,575,992 B2
(45) Date of Patent: Feb. 7, 2023

(54) SYSTEM AND METHOD FOR DYNAMIC LINE-OF-SIGHT MULTI-SOURCE AUDIO CONTROL

(71) Applicant: ARRIS ENTERPRISES LLC, Suwanee, GA (US)

(72) Inventors: Jose Alberto Gastelum Moreno, Apodaca (MX); Edgar Low Castro, Apodaca (MX); Aldo David Sanchez Rodriguez, Apodaca (MC); Javier Reyes Sanchez, General Escobedo (MX); Alberto Ornelas Carlin, Apodaca (MX)

(73) Assignee: ARRIS ENIERPRISES LLC, Suwanee, GA (US)

( * ) Notice: Subject to any disclaimer, the term of this patent is extended or adjusted under 35 U.S.C. 154(b) by 0 days.

(21) Appl. No.: 17/480,395

(22) Filed: Sep. 21, 2021

(65) Prior Publication Data

US 2022/0109934 A1    Apr. 7, 2022

Related U.S. Application Data

(60) Provisional application No. 63/086,685, filed on Oct. 2, 2020.

(51) Int. Cl.
*H04R 5/04* (2006.01)
*H04N 21/442* (2011.01)
*H04N 21/439* (2011.01)

(52) U.S. Cl.
CPC ............ *H04R 5/04* (2013.01); *H04N 21/439* (2013.01); *H04N 21/44218* (2013.01); *H04R 2420/01* (2013.01)

(58) Field of Classification Search
None
See application file for complete search history.

(56) References Cited

U.S. PATENT DOCUMENTS

| 8,983,383 | B1* | 3/2015 | Haskin | H04M 1/6041 |
| | | | | 455/556.1 |
| 10,848,894 | B2* | 11/2020 | Laaksonen | H04S 7/303 |
| 11,375,313 | B2* | 6/2022 | Lombardi | G06F 3/167 |
| 2013/0083948 | A1 | 4/2013 | Schmidt | |
| 2015/0256954 | A1 | 9/2015 | Carlsson et al. | |
| 2018/0321903 | A1 | 11/2018 | Vennström et al. | |
| 2019/0116434 | A1 | 4/2019 | Fretz | |
| 2019/0342693 | A1 | 11/2019 | Norris et al. | |
| 2020/0068335 | A1* | 2/2020 | Eronen | H04R 5/033 |
| 2020/0359158 | A1* | 11/2020 | Brimijoin, II | G06F 3/165 |

OTHER PUBLICATIONS

International Search Report and Written Opinion for Application No. PCT/US2021/051223 dated Dec. 16, 2021.

* cited by examiner

*Primary Examiner* — Paul W Huber
(74) *Attorney, Agent, or Firm* — Botos Churchill IP Law LLP

(57) ABSTRACT

A system and method for routing the audio output from a selected one of a plurality of independent audio sources to an audio system for amplification/playback; the routing being based upon the movement of a user's head, and in particular the user's line-of-sight inferred from the movement. The invention employs a spatial mapping of the plurality of audio sources and routes the respective audio output of each of the sources to the audio amplification/playback system upon making the determination that the user's line-of-sight is being directed to a particular one of the audio sources.

40 Claims, 8 Drawing Sheets

SYSTEM AND METHOD FOR DYNAMIC LINE-OF-SIGHT MULTI-SOURCE AUDIO CONTROL

CROSS-REFERENCE TO RELATED APPLICATION

This application claims the benefit of U.S. Provisional Patent Application No. 63/086,685, filed Oct. 2, 2020, which is incorporated by reference herein in its entirety.

BACKGROUND OF THE INVENTION

In any given residential environment, it is not uncommon to have multiple media devices collocated in a single room, living space or listening area, each of these media devices being capable of producing an independent audio output. For example, a multimedia gateway device (such as a digital set-top box) could be co-located with an audio device adapted to play streaming or recorded audio, as well as a separate gaming system which would produce audio output as a function of game play. It would also not be unusual for all of these disparate audio sources to share a single audio output device, such as a multi-channel audio system, a soundbar, or a digital television.

A user may choose to have one or more of these media devices active at the same time. For example, a user may choose to utilize a soundbar to listen to music being reproduced from the audio device, while employing the set-top box to display a news channel on the screen of a digital television. When a given news item was of particular interest to the user, the user could manually switch the input of the soundbar to the set-top box, enabling the playing of the news channel audio.

Although manually switching between sources could be accomplished by direct actuation of a switch upon a device such as a sound bar, or via commands issued from a wireless remote-control unit, it may not always be convenient or practical for a user to accomplish the desired switching. A user may not be within reach of the soundbar, or in possession of the particular remote-control unit required to issue needed command, or the particular command to affect the desired the audio switching isn't intuitively obvious to the user (certain commands may require the user to access a particular menu or place a remote-control unit into a particular mode before they can be accessed).

Consequently, it would be advantageous to provide for a system and method whereby a user could quickly select a desired audio source through the execution of simple, intuitive device-independent commands.

BRIEF SUMMARY OF THE INVENTION

A system and method for routing the audio output from a selected one of a plurality of independent audio sources to an audio system for amplification/playback; the routing being based upon the movement of a user's head, and in particular the user's line-of-sight inferred from the movement. The invention employs a spatial mapping of the plurality of audio sources and routes the respective audio output of each of the sources to the audio amplification/playback system upon making the determination that the user's line-of-sight is being directed to a particular one of the audio sources.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
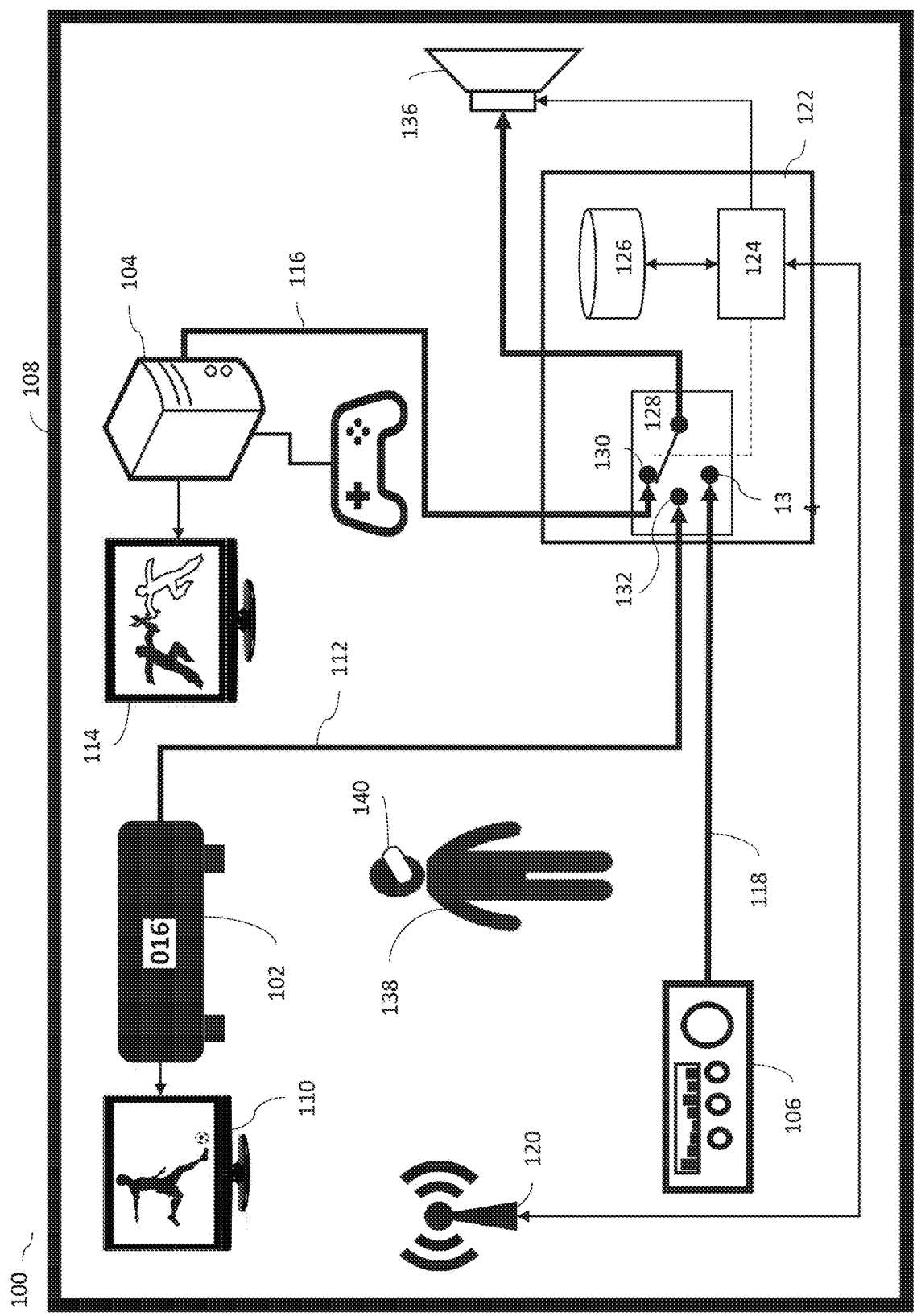
FIG. 1 is a functional block diagram of a first preferred embodiment for a system adapted to dynamically select an audio source as a function of a user's line-of-sight.

FIG. 1 is a functional diagram of a first preferred embodiment of a system (100) for dynamically selecting a particular audio source in accordance with the invention. As shown, three independent systems (102, 104 and 106), each capable of producing an audio output are situated within listening area 108. System 102 comprises a set-top box adapted to support the viewing of video content upon digital television 110. The audio associated with the video content is output by set-top box 102 on line 112. System 104 is a shown to be a gaming system adapted to be viewed upon monitor 114. The audio produced by gaming system 104 is output on line 116. The third system, 106, is music system that outputs audio to line 118. Each of the independent systems (102, 104 and 106) is also adapted to support wireless communication with wireless transceiver 120, which is situated within listening area 108. Wireless transceiver is positioned so as to ensure that signals broadcast from it propagate throughout listening area 108. Wireless transceiver 120 can employ any wireless system and protocol capable of supporting the transmission of digital content (IEEE 802.11 Wi-Fi, 802.15 ZigBee, and Bluetooth being examples of such). In addition, wireless transceiver 120 could comprise a single transceiver or multiple discrete transceivers. System 100 also includes audio switching system 122. The switching system comprises processor 124, memory 126, and switching fabric 128. As shown, switch fabric 128 is adapted to selectively connect one of three inputs (130, 132 and 134) to audio reproduction system 136. This switching fabric can be comprised of one or more physical or virtual switches. Processor 124 is shown to be linked to wireless transceiver 120.

Figure 2:
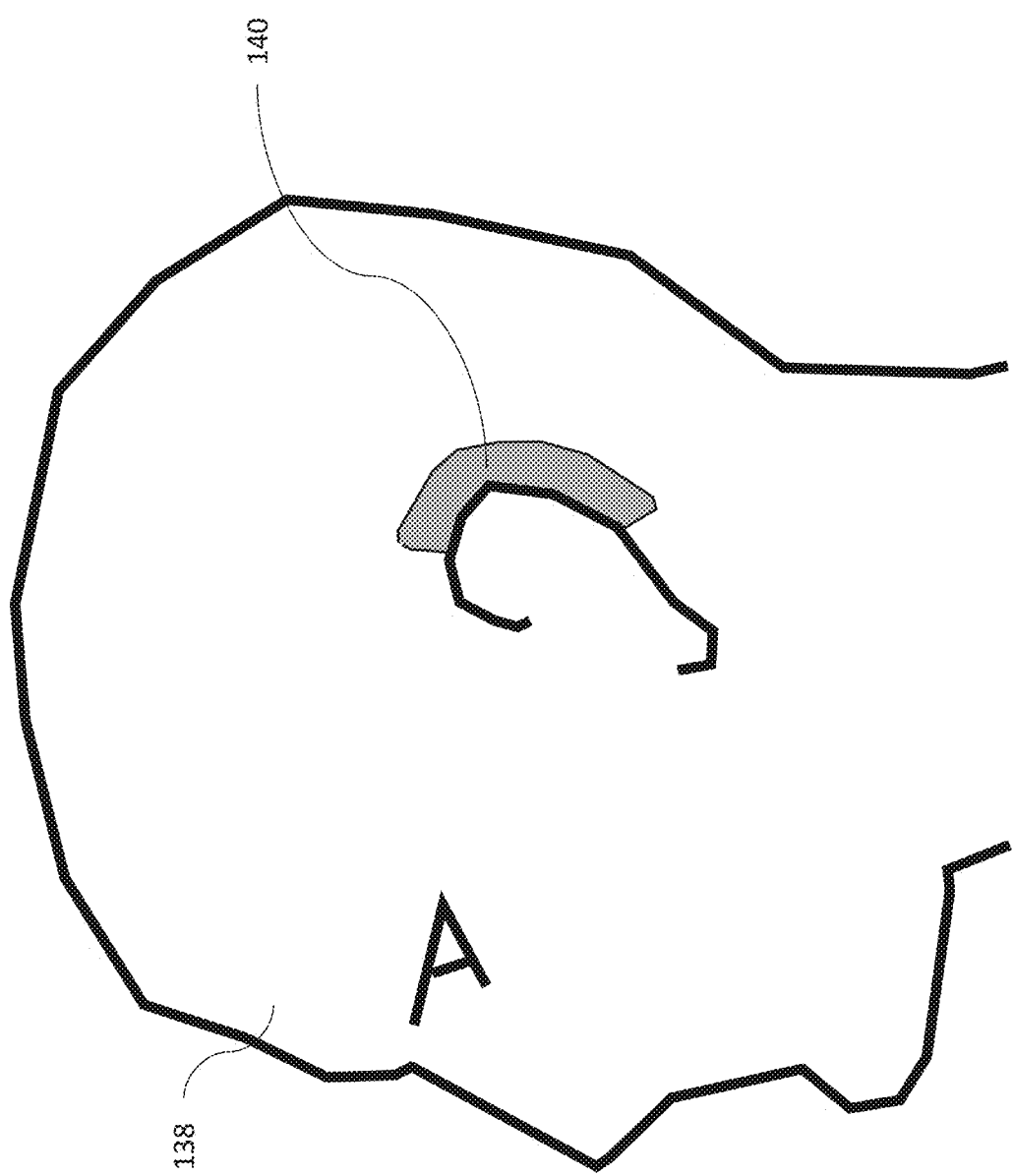
FIG. 2 is depiction of a behind-the-ear wireless device adapted to be utilized in the system of FIG. 1.
Figure 3A:
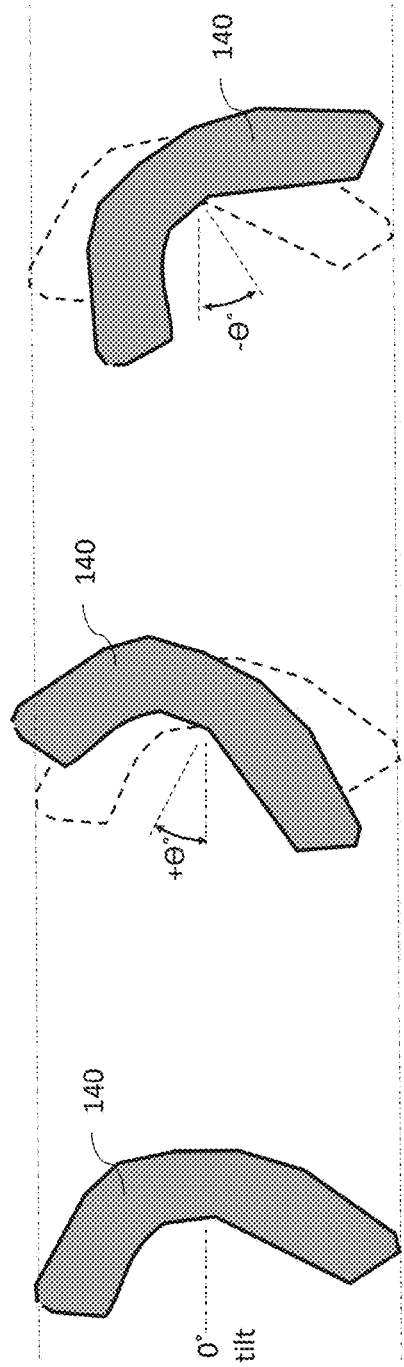
FIG. 3A is a side view of a particular embodiment of the wireless device of FIG. 2.
Figure 3B:
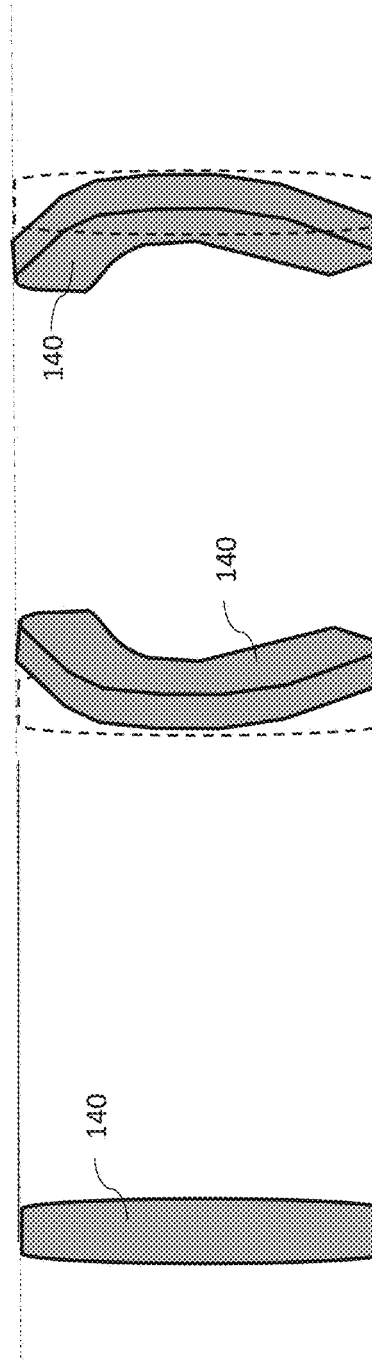
FIG. 3B is a rear view of the wireless device of FIG. 2.
Figure 3C:
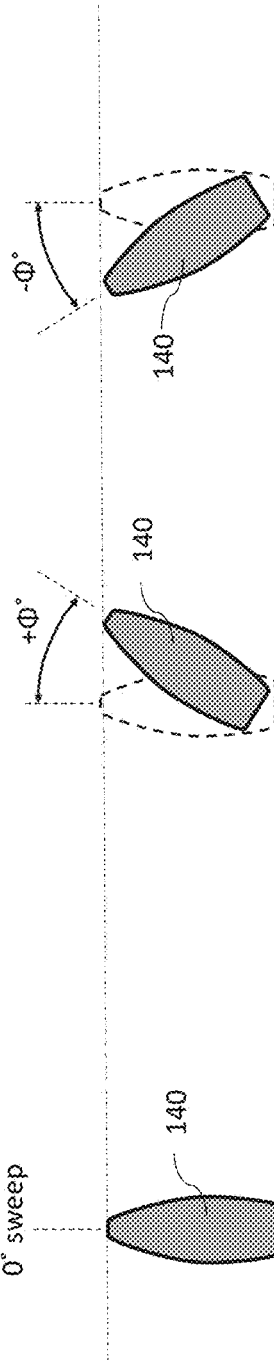
FIG. 3C is a top view of the wireless device of FIG. 2.

Also shown in FIG. 1 is user 138. User 138 is situated within listening area 108 and is utilizing wireless line-of-sight ("LOS") detector 140. LOS device 140 is adapted to detect, store and transmit information indicative of the device's relative position within listening area 108 with respect to wireless transceiver 120. FIGS. 2 and 3A-C provide more detailed depictions of one embodiment of LOS device 140. As shown in FIG. 2, this particular embodiment is adapted to be worn behind the ear of a user. FIG. 3 shows a side view of LOS device 140 as it rotated in the y-plane from a position of 0° to a position of +$\Theta$° and then -$\Theta$° (referred to as the tilt angle). FIGS. 3B and 3C show a rear and top view, respectively, of LOS device 140 being rotated in the x-plane from a position of 0° to a position of +$\Phi$° and then -$\Phi$° (referred to as the sweep angle). Wireless device 140 comprises a sensor to detect and measure relative movement in both the x-plane and y-plane. Such sensors are well known in the art are typically comprised of orthogonally-situated accelerometers of gyroscopic sensors that convert measured acceleration (or displacement in the case of gyroscopic sensors) to numerical values. These numerical values, indicative of LOS device orientation, would then be transmitted to wireless transceiver 140.

Figure 4:
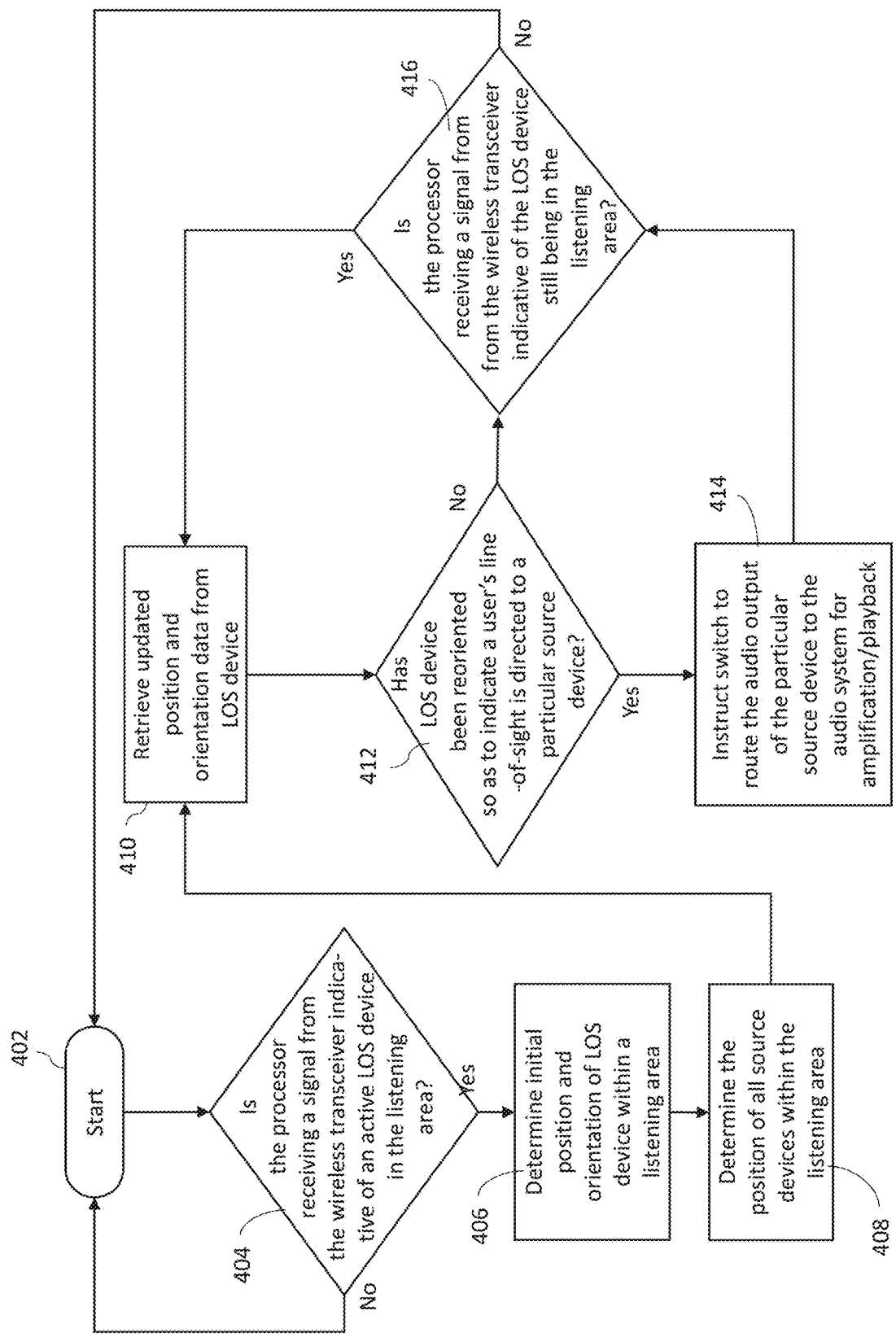
FIG. 4 is a flow diagram of a process supported within the system of FIG. 1.

Processor 124 is adapted to utilize information stored in memory 126 along with positional and motion data received via wireless transceiver 120 to control switching fabric 128 and thereby connect a selected one of audio output lines 112, 116 and 118 to audio reproduction system 136. The process enabling this is illustrated in the flow diagram of FIG. 4.

The process initiates when processor 124 tests for the reception of wireless transceiver 120 data indicative of an active LOS device (140) in listening area 108 (steps 402 and 404). Upon confirmation of such, processor 124 obtains from wireless transceiver 120 data indicative of the initial position and orientation of LOS device 140 (step 406). Numerous approaches for the indoor localization of wireless devices are known in the art, including those relying upon one or more of the following: received radio signal strength ("RSS"), radio fingerprint mapping, angle of arrival sensing, and time of flight measurements. The present state-of-the-art provides for employing these approaches, or combinations of these approaches, to permit device localization within wireless systems utilizing single or multiple transceiver arrangements. Once the position of LOS device 140 within listening area 108 has been determined, processor then obtains information indicative of the orientation of LOS device 140. This would be the initial orientation from which angles of tilt and sweep movement will be measured.

Processor 124 then determines the location of each independent system (102, 104 and 106) within listening area 108 (step 408). This would be accomplished in a manner similar that employed to determine the position of LOS device 140. The initial position and orientation information for LOS device 140, as well as the position information for systems 102, 104 and 106 is stored in memory 126 by processor 124.

The process then continues with step 410, wherein processor 124 retrieves updated LOS device position and orientation data via wireless transceiver 120. The processor then compares this updated data with the previously stored LOS device position and orientation data. The delta between the updated and previously stored LOS position and orientation data, along with the stored position data for systems 102, 104 and 106 is then utilized by processor 124 to determine if LOS device 140 has been placed into a position and orientation indicative of user 138 directing their line-of-sight at one of systems 102, 104 or 106 (step 412). If such a determination indicates that user 138 is indeed looking at a particular one of the devices, processor 124 instructs switching fabric 128 to connect the output line associated with that system to audio reproduction system 136 (step 414). FIG. 1 depicts the particular situation where processor 124 determined that user 138 was directing their gaze toward gaming system 104. Consequently, processor 124 instructed switching fabric 128 to connect output line 116 (via terminal 130) to audio reproduction system 136.

The processor then determines if signals received from wireless transceiver 120 indicate that LOS device 140 is still within listening area 108 (step 416). If so, the process proceeds to step 410 and processor 124 retrieves updated LOS device position and orientation data via wireless transceiver 120. If the conditional of step 416 resulted in a negative outcome, the process would revert to steps 402 and 404, and processor 124 would test for wireless transceiver 120 data indicative of an active LOS device (140) being in listening area 108.

If at step 412 it was determined that LOS device 140 was not placed into a position and orientation indicative of user 138 directing their line-of-sight at one of systems 102, 104 or 106, the process would have continued with step 416.

Figure 5:
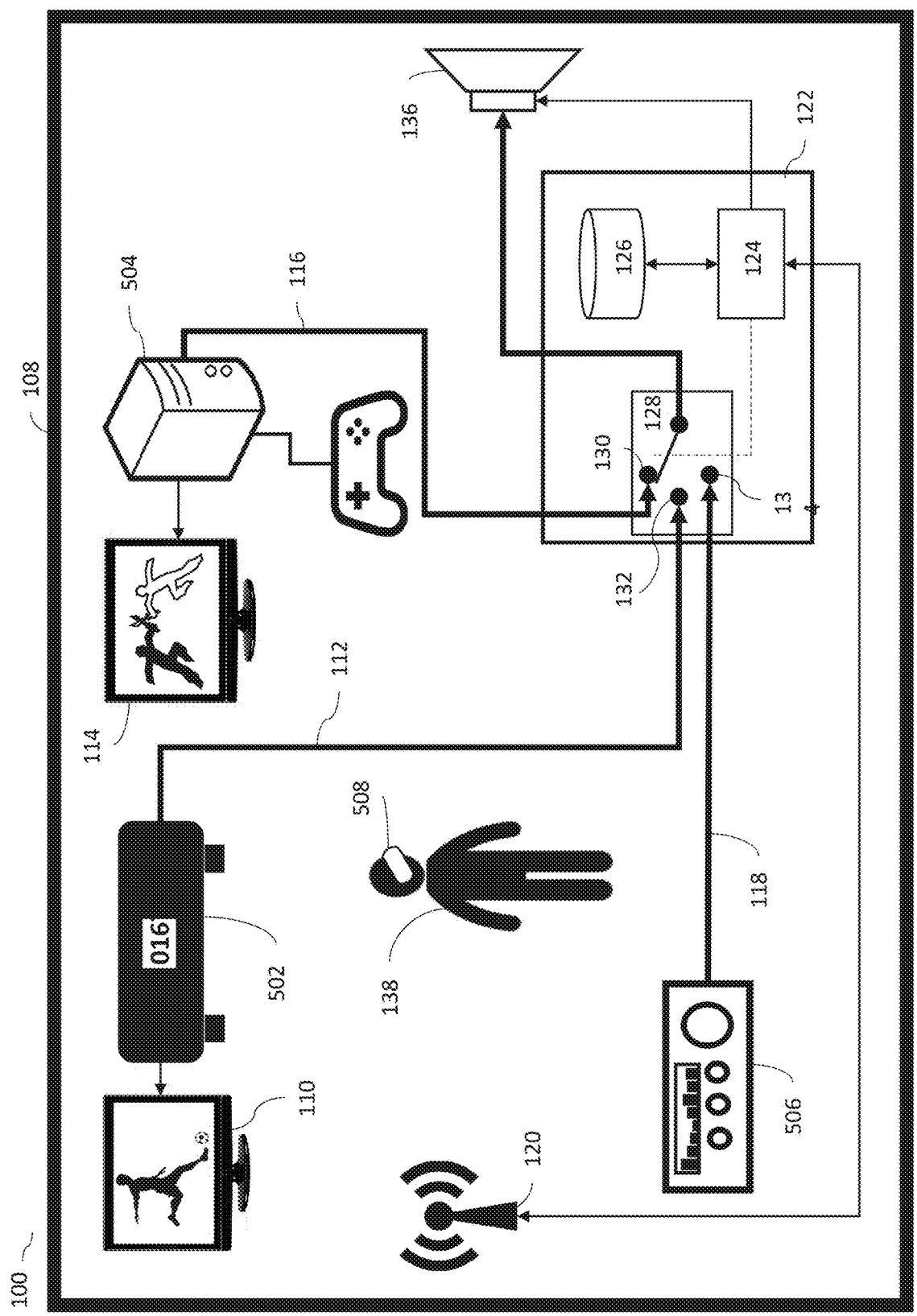
FIG. 5 is a functional block diagram of an alternate preferred embodiment for a system adapted to dynamically select an audio source as a function of a user's line-of-sight.

FIG. 5 depicts a system (500) supporting an alternate embodiment of the invention. System 500 is primarily identical to system 100, and like components have been numbered in the same manner as FIG. 1. However, the independent systems, consisting of set-top box 502, gaming system 504 and music system 506, differ from the independent systems of system 100. None of the independent system of system 500 are adapted to support wireless communication with wireless transceiver 120. Consequently, wireless transceiver 120 cannot be utilized to determine the relative location of these independent systems within listening area 108.

Figure 6:
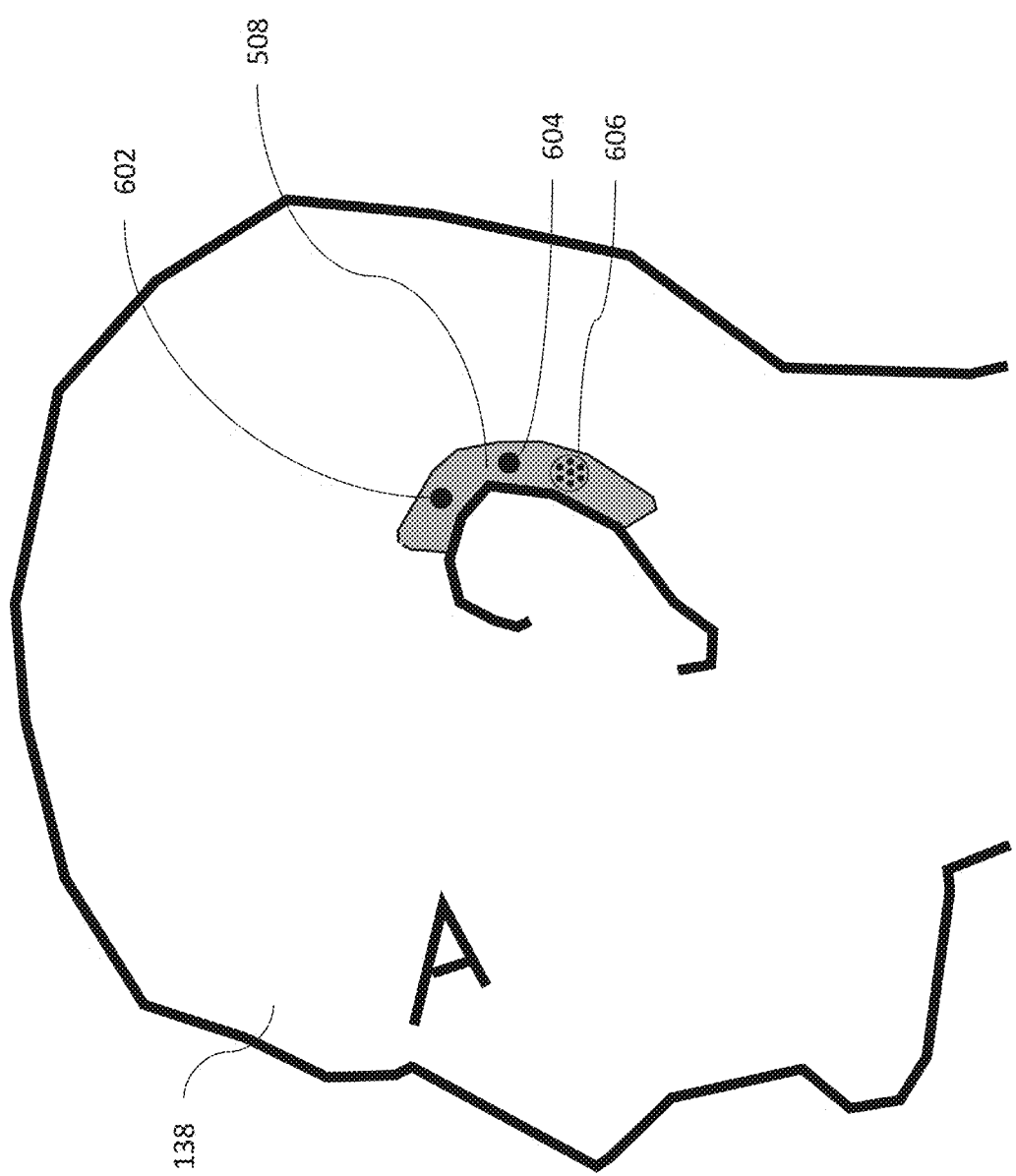
FIG. 6 is a depiction of an alternate embodiment of a behind-the-ear wireless device adapted to be utilized in the system of FIG. 1.

System 500 is also shown to include LOS device (508). LOS device 508 differs from that of the LOS device (140) of system 100 (FIG. 1), as it includes calibration button 602, a device select button 604, and audio transducer 606 (see FIG. 6). The buttons can be actuated by the user (138) to properly calibrate LOS device 508 for operation within listening area 108.

To initiate the calibration process user 138 would momentarily depress calibration button 602. Upon actuation, LOS device 508 enters a calibration mode and detects and the initial position and orientation of LOS device 508 within listening room 108. LOS 508 then transmits information indicative of this initial position and orientation to processor 124 via wireless transceiver 120. Processor 124 stores the information in memory 126.

The user would then direct his or her line-of-sight to each of the independent systems (502, 504 and 506) within listening area 108. Upon fixing their gaze upon a particular independent system, the user would momentarily depress device select button 604. In response, LOS device 508 detect its relative position and orientation withing listening area 108 and transmits information indicative of such to processor 124 for storage in memory 126. Upon receipt of the relative position and orientation information, processor 124 would transmit information representing samples of audio being produced by each of the independent systems. These samples would be provided in a sequentially and reproduced by audio transducer 606. Upon hearing the audio sample that corresponded with the particular independent system to which the user had directed their line-of-sight, the user momentarily would re-depress device select button 604. Information indicative of the re-depression of the button during a playing of particular audio sample would be transmitted by LOS device 508 to processor 124. Processor 124 then store within memory 126 information associating the independent system that produced the selected audio sample and the most recently received relative position and orientation information. The user would repeat this device select button procedure for each of the independent systems within listening area 108. Upon completion of the device select process the user would momentarily depress calibration button 602 to bring LOS device 508 out of calibration mode.

Figure 7:
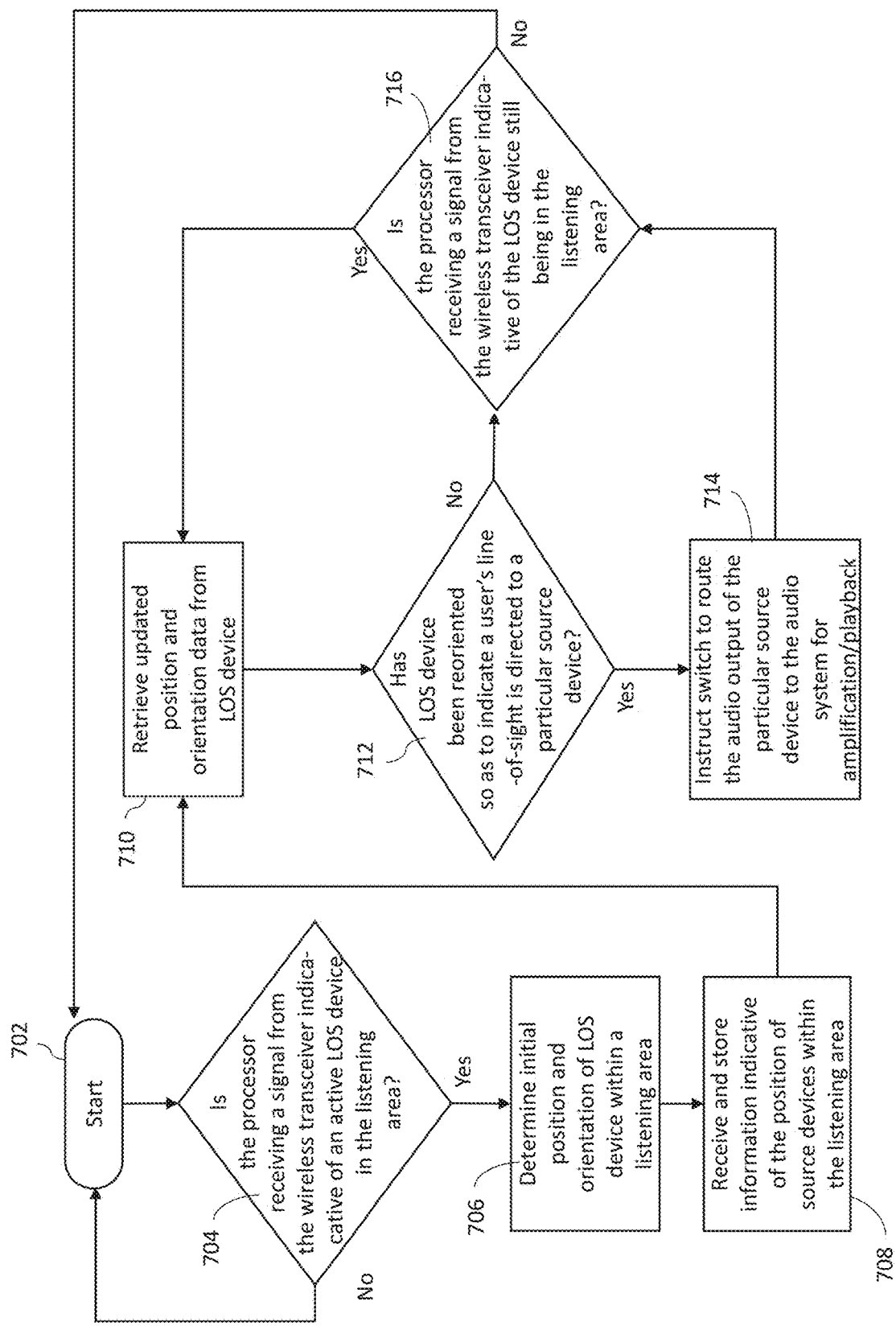
FIG. 7 is a flow diagram of a process supported within the system of FIG. 5.
Figure 8D:
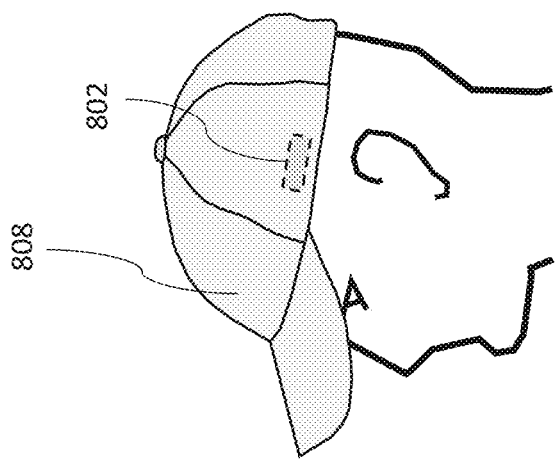
FIG. 8D is shows a line-of-sight device compatible with the system of FIGS. 1 and 5 integrated with a hat.
Figure 8C:
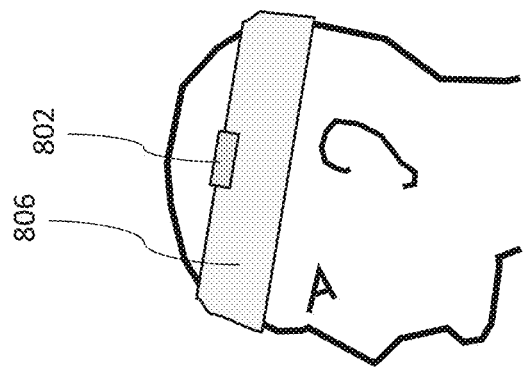
FIG. 8C is shows a line-of-sight device compatible with the system of FIGS. 1 and 5 attached to a headband.
Figure 8B:
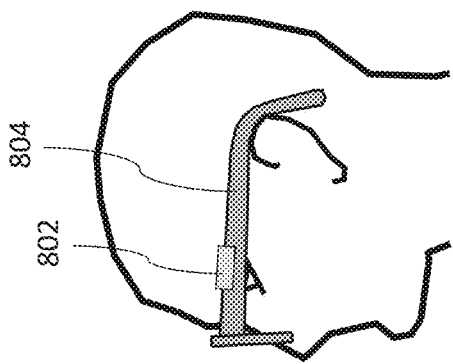
FIG. 8B is shows a line-of-sight device compatible with the system of FIGS. 1 and 5 attached to a pair of glasses.
Figure 8A:
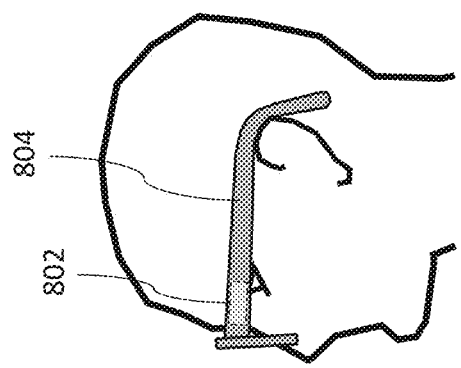
FIG. 8A is shows a line-of-sight device compatible with the systems of FIGS. 1 and 5 integrated with a pair of glasses.

The operation of system 500 then would operate a manner similar to that of system 100 (as detailed in the flow diagram of FIG. 7). After detecting that an active LOS device is within the listening area (steps 702 and 704), a determination is made as to the initial position and orientation of that LOS device (step 706). Then, in step 708 information indicative of the position of independent systems that serve as audio sources is obtained and stored (via the calibration process detailed above). Updated LOS device position and orientation data is received by processor 124 and compared to previously stored LOS device position and orientation data (steps 710 and 712). The delta between the updated and previously stored LOS position and orientation data, along with the stored position data for systems 502, 504 and 506 is then utilized by processor 124 to determine if LOS device 508 is in a position and orientation indicative of user 138 directing their line-of-sight at a particular one of the systems 102 (step 712). If so, processor 124 instructs switching fabric 128 to connect the output line associated with that system to audio reproduction system 136 (step 714).

The processor then determines if signals received from wireless transceiver 120 indicate that LOS device 508 is still within listening area 108 (step 716). If so, the process proceeds to step 710 and processor 124 retrieves updated LOS device position and orientation data via wireless transceiver 120. If the conditional of step 716 resulted in a negative outcome, the process would revert to steps 702 and 704, and processor 124 would test for wireless transceiver 120 data indicative of an active LOS device being in listening area 108. If at step 712 it was determined that LOS device 508 was not placed into a position and orientation indicative of user 138 directing their line-of-sight at one of systems 502, 504 or 506, the process would have continued with step 716.

The LOS devices have been described as a behind-the-ear appliance in the above embodiment, however, it will be understood that there are numerous configurations for such a device that could be utilized. For example, as shown in FIGS. 8A-D, LOS device (802) could be embedded within a pair of glasses or goggles (804), clipped or embedded within a headband (806), or integrated into a cap, hat or other headgear (808).

Although the invention herein has been described with reference to particular embodiments, it is to be understood that these embodiments are merely illustrative of the principles and applications of the present invention. For example, the link between the audio switching system and the audio reproduction system could be wired or wireless. The user could also utilize a personal listening device, such as headphones or wireless earbuds to listen to the output of the audio reproduction system. The system could be adapted to recognize multiple LOS devices within a single listening area, or multiple systems could be deployed within a single listening area. This would enable the provision of independent audio programs to multiple personal listening devices, wherein each of the listening devices receives a particular audio program based upon the position and orientation of an associated LOS device. Additionally, the audio switching system could be integrated into another device such as a set-top box, audio reproduction system, or other media appliance. The devices utilized to view video content could include any suitable device including televisions, tablets, computer displays, smartphones, projectors, a digital assistant, etc. All of the above variations and reasonable extensions therefrom could be implemented and practiced without departing from the spirit and scope of the present invention as defined by the appended claims.

The invention claimed is:

1. A system for selecting a particular audio source from among a plurality of audio sources, the system comprising:
   a wireless transceiver adapted to communicate with devices within a listening area;
   a plurality of audio devices located within the listening area, wherein each audio device produces an independent audio output and is adapted to transmit information indicative of its location within the listening area to the wireless transceiver;
   a switching fabric, linked to an audio output of each of the plurality of audio devices and adapted to establish a connection to the audio output of a single selected one of the plurality of audio outputs;
   a sensor adapted to produce signals indicative of a user's position and line-of-sight within the listening area and to transmit information indicative of such to the wireless transceiver; and
   at least one processor adapted to:
   determine, based upon the information indicative of the location of the plurality of audio devices and the information indicative of the user's position and line-of-sight within the listening area, that the user's line-of-sight is directed to a particular one of the plurality of audio devices; and
   based at least in part upon the determination, instruct the switching fabric to establish an exclusive connection to the audio output of a particular one of the plurality of audio devices.

2. The system of claim 1 wherein the signals indicative of the user's line-of-sight comprise information indicative of:
   the position of the sensor within the listening area;
   the tilt angle of the sensor with respect to an initial orientation; and
   the sweep angle of the sensor with respect to an initial orientation.

3. The system of claim 1 wherein the sensor comprises at least one of:
   at least one accelerometer; and
   at least one gyroscopic sensor.

4. The system of claim 1 wherein the system for selecting a particular audio source from among a plurality of audio sources comprises a set-top box.

5. The system of claim 1 wherein the sensor comprises:
   an earpiece;
   eyewear; and
   headgear.

6. The system of claim 1 wherein the switching fabric comprises at least one of the following:
   a plurality of physical switches; and
   a plurality of virtual switches.

7. The system of claim 1 wherein at least one of the plurality of audio sources comprises at least one of the following:

a television;
a gaming system;
a computer monitor;
a tablet;
a smartphone;
a projector;
an audio system; and
a digital assistant.

8. The system of claim 1 wherein the wireless transceiver comprises at least one of:
a radio frequency transceiver;
a wi-fi transceiver;
a Bluetooth transceiver; and
a Zig-Bee transceiver.

9. The system of claim 1 further comprising an audio reproduction system adapted to audibly reproduce the audio output selected by the switching fabric.

10. The system of claim 9 wherein the audio reproduction system comprises at least one of the following:
a television;
a headset; and
a speaker system.

11. A method for selecting a particular audio source from among a plurality of audio sources, in a system comprising:
a wireless transceiver adapted to communicate with devices within a listening area;
a plurality of audio devices located within the listening area, wherein each audio device produces an independent audio output and is adapted to transmit information indicative of its location within the listening area to the wireless transceiver;
a switching fabric, linked to an audio output of each of the plurality of audio devices and adapted to establish a connection to the audio output of a single selected one of the plurality of audio outputs; and
a sensor adapted to produce signals indicative of a user's position and line-of-sight within the listening area and to transmit information indicative of such to the wireless transceiver;
the method comprising the steps of:
determining, based upon the information indicative of the location of the plurality of audio devices and the information indicative of the user's line-of-sight within the listening area, that the user's line-of-sight is directed to a particular one of the plurality of audio devices; and
based at least in part upon the determination, actuating the switching fabric to establish an exclusive connection to the audio output of a particular one of the plurality of audio devices.

12. The method of claim 11 wherein the signals indicative of the user's position and line-of-sight comprise information indicative of:
the position of the sensor within the listening area;
the tilt angle of the sensor with respect to an initial orientation; and
the sweep angle of the sensor with respect to an initial orientation.

13. The method of claim 11 wherein the sensor comprises at least one of:
at least one accelerometer; and
at least one gyroscopic sensor.

14. The method of claim 11 wherein the switching fabric comprises a set-top box.

15. The method of claim 11 wherein the sensor comprises:
an earpiece;
eyewear; and
headgear.

16. The method of claim 11 wherein the switching fabric comprises at least one of the following:
a plurality of physical switches; and
a plurality of virtual switches.

17. The method of claim 11 wherein at least one of the plurality of audio sources comprises at least one of the following:
a television;
a gaming system;
a computer monitor;
a tablet;
a smartphone;
a projector;
an audio system; and
a digital assistant.

18. The method of claim 11 wherein the wireless transceiver comprises at least one of:
a radio frequency transceiver;
a wi-fi transceiver;
a Bluetooth transceiver; and
a Zig-Bee transceiver.

19. The method of claim 11 further comprising the step of connecting the audio output selected by the switching fabric to an audio reproduction system.

20. The method of claim 19 wherein the system for audible audio reproduction system comprises at least one of the following:
a television;
a headset; and
a speaker system.

21. A system for selecting a particular audio source from among a plurality of audio sources, the system comprising:
a wireless transceiver adapted to communicate with devices within a listening area;
a plurality of audio devices located within the listening area, wherein each audio device produces an independent audio output;
a switching fabric, linked to the audio output of each of the plurality of audio devices and adapted to establish a connection to the audio output of a single selected one of the plurality of audio outputs;
a sensor adapted to produce signals indicative of a user's line-of-sight within the listening area and to transmit information indicative of such to the wireless transceiver; and
at least one processor adapted to:
collect and transmit information indicative of the location of each of the plurality of audio devices within the listening area, based at least in part upon signals received from the sensor;
determine, based, at least in part, upon the information indicative of the location of the plurality of audio devices and the information indicative of the user's line-of-sight within the listening area, that the user's line-of-sight is directed to a particular one of the plurality of audio devices; and
based at least in part upon the determination, instruct the switching fabric to establish an exclusive connection to the audio output of a particular one of the plurality of audio devices.

22. The system of claim 21 wherein the signals indicative of the user's line-of-sight comprise information indicative of:

the position of the sensor within the listening area;
the tilt angle of the sensor with respect to an initial orientation; and
the sweep angle of the sensor with respect to an initial orientation.

23. The system of claim 21 wherein the signals indicative of the location of the audio sources comprise information indicative of:
the position of the sensor within the listening area;
the tilt angle of the sensor with respect to an initial orientation; and
the sweep angle of the sensor with respect to an initial orientation.

24. The system of claim 21 wherein the sensor further comprises at least one audio transducer; and wherein the determination that that the user's line-of-sight is directed to a particular one of the plurality of audio devices is further based upon a user response to audio produced by the at least one audio transducer.

25. The system of claim 21 wherein the sensor comprises at least one of:
at least one accelerometer; and
at least one gyroscopic sensor.

26. The system of claim 21 wherein the system for selecting a particular audio source from among a plurality of audio sources comprises a set-top box.

27. The system of claim 21 wherein the sensor comprises:
an earpiece;
eyewear; and
headgear.

28. The system of claim 21 wherein the switching fabric comprises at least one of the following:
a plurality of physical switches; and
a plurality of virtual switches.

29. The system of claim 21 wherein at least one of the plurality of audio sources comprises at least one of the following:
a television;
a gaming system;
a computer monitor;
a tablet;
a smartphone;
a projector;
an audio system; and
a digital assistant.

30. The system of claim 21 further comprising an audio reproduction system adapted to audibly reproduce the audio output selected by the switching fabric.

31. A method for selecting a particular audio source from among a plurality of audio sources, in a system comprising:
a wireless transceiver adapted to communicate with devices within a listening area;
a plurality of audio devices located within the listening area, wherein each audio device produces an independent audio output;
a switching fabric, linked to an audio output of each of the plurality of audio devices and adapted to establish a connection to the audio output of a single selected one of the plurality of audio outputs; and
a sensor adapted to produce signals indicative of a user's line-of-sight within the listening area and to transmit information indicative of such to the wireless transceiver;

the method comprising the steps of:
collecting information indicative of the location of each of the plurality of audio devices within the listening area, based at least in part upon signals received from the sensor;
determining, based, at least in part, upon the information indicative of the location of the audio devices and the information indicative of the user's line-of-sight within the listening area, that the user's line-of-sight is directed to a particular one of the plurality of audio devices; and
based at least upon the determination, instructing the switching fabric to establish an exclusive connection to the audio output of a particular one of the plurality of audio devices.

32. The method of claim 31 wherein the signals indicative of the user's line-of-sight comprise information indicative of:
the position of the sensor within the listening area;
the tilt angle of the sensor with respect to an initial orientation; and
the sweep angle of the sensor with respect to an initial orientation.

33. The method of claim 31 wherein the signals indicative of the location of the audio sources comprise information indicative of:
the position of the sensor within the listening area;
the tilt angle of the sensor with respect to an initial orientation; and
the sweep angle of the sensor with respect to an initial orientation.

34. The method of claim 31 wherein the sensor further comprises at least one audio transducer; and wherein the step of determining that that the user's line-of-sight is directed to a particular one of the plurality of audio devices is further based upon a user response to audio produced by the at least one audio transducer.

35. The method of claim 31 wherein the sensor comprises at least one of:
at least one accelerometer; and
at least one gyroscopic sensor.

36. The method of claim 31 wherein the system for selecting a particular audio source from among a plurality of audio sources comprises a set-top box.

37. The method of claim 31 wherein the sensor comprises:
an earpiece;
eyewear; and
headgear.

38. The method of claim 31 wherein the switching fabric comprises at least one of the following:
a plurality of physical switches; and
a plurality of virtual switches.

39. The method of claim 31 wherein at least one of the plurality of audio sources comprises at least one of the following:
a television;
a gaming system;
a computer monitor;
a tablet;
a smartphone;
a projector;
an audio system; and
a digital assistant.

40. The method of claim 31 further comprising an audio reproduction system adapted to audibly reproduce the audio output selected by the switching fabric.

* * * * *